(12) United States Patent
Ferguson

(10) Patent No.: US 7,778,315 B2
(45) Date of Patent: Aug. 17, 2010

(54) MEASURING INSTANTANEOUS SIGNAL DEPENDENT NONLINEAR DISTORTION IN RESPONSE TO VARYING FREQUENCY SINUSOIDAL TEST SIGNAL

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 1173 days.

(21) Appl. No.: 11/090,493

(22) Filed: Mar. 23, 2005

(65) Prior Publication Data

US 2005/0233702 A1    Oct. 20, 2005

(51) Int. Cl.
H04B 3/46    (2006.01)

(52) U.S. Cl. .................................. 375/224; 375/231

(58) Field of Classification Search ............... 375/224, 375/231; 702/75–77, 70, 79, 106, 189, 190, 702/197, 191, 195; 455/67.14; 324/626, 324/613, 76.11; 370/229, 230, 231, 232, 370/233, 234, 235
See application file for complete search history.

(56) References Cited

U.S. PATENT DOCUMENTS

| | | | |
|---|---|---|---|
| 3,624,497 A | 11/1971 | Max |
| 3,663,954 A | 5/1972 | Alker |
| 3,730,984 A | 5/1973 | Smith |
| 3,781,669 A | 12/1973 | Dick |
| 3,807,226 A | 4/1974 | Williams |
| 3,825,835 A | 7/1974 | Hammett |
| 4,114,136 A | 9/1978 | D'Albora |
| 4,139,815 A | 2/1979 | Mueller |
| 4,172,263 A | 10/1979 | Tenten |
| 4,249,210 A | 2/1981 | Storey |
| 4,258,314 A | 3/1981 | Hirata |
| 4,362,394 A | 12/1982 | Menlove |
| 4,563,637 A | 1/1986 | De Bortoli |
| 4,654,861 A | 3/1987 | Godard |
| 4,670,712 A | 6/1987 | Lavergnat |
| 4,725,901 A | 2/1988 | Eiberger |
| 4,774,454 A | 9/1988 | Yamaguchi |
| 4,777,648 A | 10/1988 | Gardner |
| 4,810,101 A | 3/1989 | Kage |
| 4,890,158 A | 12/1989 | Baker |
| 5,010,504 A | 4/1991 | Lee |
| 5,089,782 A | 2/1992 | Pike |
| 5,113,139 A | 5/1992 | Furukawa |
| 5,206,727 A | 4/1993 | Ebihara |
| 5,263,185 A | 11/1993 | Bush |

(Continued)

*Primary Examiner*—Shuwang Liu
*Assistant Examiner*—Helene Tayong
(74) *Attorney, Agent, or Firm*—Francis I. Gray; Michael A. Nelson

(57) ABSTRACT

A method of measuring instantaneous signal-dependent nonlinear distortion in a system under test in response to a test signal having a varying frequency sinusoidal component, such as a swept frequency signal or a multi-burst signal, uses a time window to locate a frequency of interest in the corresponding varying frequency component of a signal output from the system under test. Once the location of the frequency of interest is located in the output signal, a spectrum of the portion of the output signal within the time window is generated and the magnitudes of the spectral peaks, including the spectral peak for the frequency of interest or nominal frequency and all isolated peaks representing distortion frequencies, are measured. The amount of distortion is calculated as a ratio of the square-root of the sum of the magnitudes of the distortion frequencies to the magnitude of the nominal frequency.

3 Claims, 2 Drawing Sheets

U.S. PATENT DOCUMENTS

| | | |
|---|---|---|
| 5,343,404 A | 8/1994 | Girgis |
| 5,594,439 A | 1/1997 | Swanson |
| 5,608,331 A | 3/1997 | Newberg |
| 5,767,995 A | 6/1998 | Rainal |
| 5,818,240 A | 10/1998 | Cabot |
| 5,938,594 A | 8/1999 | Poon |
| 6,094,623 A | 7/2000 | Mintchev |
| 6,097,194 A * | 8/2000 | Zwemstra et al. ............ 324/615 |
| 6,140,822 A | 10/2000 | Williams |
| 6,185,509 B1 | 2/2001 | Wilstrup |
| 6,240,130 B1 | 5/2001 | Burns |
| 6,246,717 B1 | 6/2001 | Chen |
| 6,275,523 B1 | 8/2001 | Chen |
| 6,344,749 B1 | 2/2002 | Williams |
| 6,434,501 B1 | 8/2002 | Cherrette |
| 6,449,569 B1 | 9/2002 | Melanson |
| 6,449,570 B1 | 9/2002 | Wilstrup |
| 6,502,045 B1 | 12/2002 | Biagiotti |
| 6,524,248 B1 | 2/2003 | Bullis |
| 6,566,891 B1 | 5/2003 | Aggarwal |
| 6,570,394 B1 | 5/2003 | Williams |
| 6,629,449 B1 * | 10/2003 | Kline-Schoder et al. ... 73/19.03 |
| 6,778,263 B2 * | 8/2004 | Ortyn et al. .................... 356/28 |
| 7,221,167 B2 * | 5/2007 | Klippel et al. ............... 324/626 |
| 2002/0075013 A1 | 6/2002 | Schell |
| 2002/0094022 A1* | 7/2002 | Bially et al. ................. 375/148 |
| 2002/0163958 A1 | 11/2002 | Yamaguchi |
| 2003/0058970 A1 | 3/2003 | Hamre |
| 2003/0133495 A1 * | 7/2003 | Lerner et al. ................. 375/139 |

* cited by examiner

MEASURING INSTANTANEOUS SIGNAL DEPENDENT NONLINEAR DISTORTION IN RESPONSE TO VARYING FREQUENCY SINUSOIDAL TEST SIGNAL

BACKGROUND OF THE INVENTION

The present invention relates to signal distortion measurements, and more particularly to a method of measuring instantaneous signal dependent nonlinear distortion in a system under test in response to varying frequency sinusoidal test signals.

Many users need to measure signal amplitude versus frequency of multi-burst and portions of swept sinusoidal test signals in the presence of noise, data compression artifacts and other nonlinear distortions such as frequency aliases common from television set-top boxes and computer graphics cards, quantization error and noise due to a test platform, etc. A multi-burst signal is a signal that has short bursts of sinusoidal signals at increasing, or decreasing, frequencies in a defined time interval, while a linear swept sinusoidal signal is one that linearly increases, or decreases, in frequency in the defined time interval. The variation in amplitude of the bursts or swept signal provide an indication of the frequency response of a system being tested. Presently the signal dependent nonlinear distortion is not measured directly for varying frequency sinusoidal signals in the video domain, but rather is measured using traditional signals, such as ramp or step signals, which often have very low distortion (<1% for example) while the distortion of the sinusoidal signals may be quite large (>50% in some cases). Further confusion in uncorrelated signal fidelity information is due to the fact that sinusoidal signal amplitudes may measure smaller or even larger than the envelope of the signal would indicate on a waveform display due to this otherwise unmeasured distortion.

In distortion testing of sinusoidal signals in video systems the test signals for frequency response include the multi-burst or swept frequency sinusoidal signals. For multi-burst signals typically five or six bursts, each with a different frequency, are used. The specific set of frequencies may vary depending on the video test signal source and format. These frequencies are not always known in advance when making frequency response measurements.

Also for both broadcast digital video and computer video, devices such as set-top boxes and computer graphics cards may reformat the video such that frequencies may shift. These devices also introduce errors such as noise and frequency aliasing. These errors and digital compression artifacts interfere with prior methods for measuring burst frequencies. A recently developed method for measuring magnitude and phase of a given frequency given a point in time or a frequency of interest is disclosed in U.S. Patent Publication Nos. 2004-0161061-A1 and 2004-0161027-A1.

In the area of nonlinear distortion measurements there are several related relevant methods:
  nonlinearity measurements of analog video using ramps and steps; and
  out of frequency band method including harmonic distortion measurements of sinusoids (especially in audio).

The methods as applied to video have been limited to measuring the consistency of ramp slope or step size of corresponding test signals. These methods do not address distortions in sinusoids and for many processes, such as MPEG (Motion Picture Experts Group) compression, the nonlinearities of ramps and steps do not indicate the nonlinearities of sinusoids. Further harmonic distortion measurements that specifically measure magnitudes of harmonics generally do not apply to video because the nonlinear distortions are usually not harmonics, but may be non-harmonic modulation products as in the case of frequency aliases. Also in the method of measuring out-of-band energy, the swept sinusoidal test signal presents a problem in that it contains a wide spectrum of energy. Even if this is time-windowed prior to applying any of this rms out-of-narrowband distortion class of methods, generally noise and signal dependent distortions are not delineated as desired. Further it is desirable to use the swept sinusoid to allow frequency response measurements, with the distortion measurement used as a way to distinguish among linear distortion (amplitude, phase), additive noise (signal independent) and nonlinear distortion. Combining a noise measurement with the out-of-band energy measurement, in order to delineate noise from distortion as a function of the test signal, is problematic for acceptable accuracy levels due to the variance of the noise measurement over a short time interval.

What is desired is a method for measuring corresponding nonlinear distortion at each point in time or frequency given, specifically an automated method for measuring the distortion of sinusoidal test signal components of impaired analog and digital video that is virtually instantaneous (specific to a point on a video line).

BRIEF SUMMARY OF THE INVENTION

Accordingly the present invention provides a method of measuring instantaneous signal dependent nonlinear distortion in a system under test in response to swept and burst sinusoidal test signals by using a time window to locate a frequency of interest in the sinusoidal test signal. Once the location of the frequency of interest is located, a spectrum of the signal within the time window is generated and the magnitudes of the spectral peaks, including the spectral peak for the frequency of interest (nominal frequency) and all isolated peaks (distortion frequencies), are measured. The amount of distortion is calculated as a ratio of the square-root of the sum of the magnitudes of the isolated peaks to the magnitude of the spectral peak for the frequency of interest.

The objects, advantages and other novel features of the present invention are apparent from the following detailed description when read in conjunction with the appended claims and attached drawing.

DETAILED DESCRIPTION OF THE INVENTION

Figure 1:
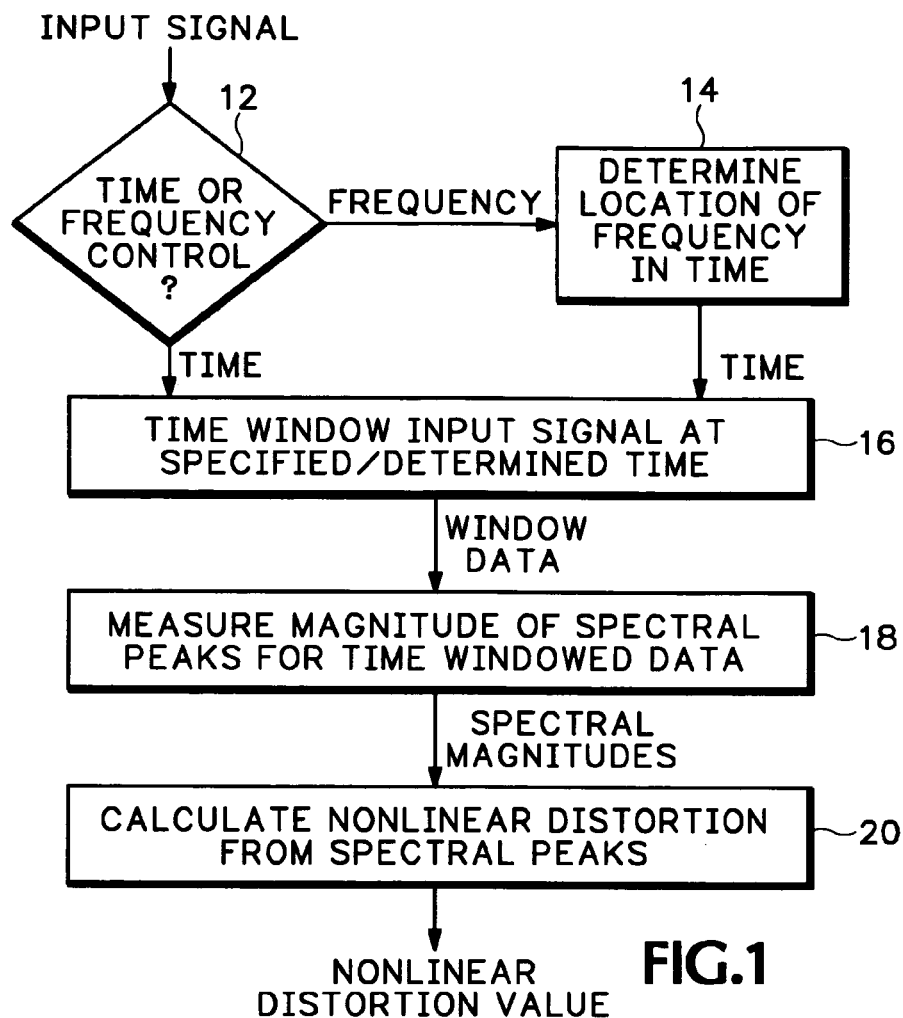
FIG. 1 is a flow diagram view of a method of measuring instantaneous signal dependent nonlinear distortion according to the present invention.

Referring now to FIG. 1 a method is shown for measuring nonlinear distortion in a varying frequency sinusoidal signal, either multi-burst or swept, output from a system under test. A narrow time window is used to produce time windowed data that represents a portion of the output signal that contains a frequency of interest. A spectrum of the time windowed data is used to determine magnitudes of spectral peaks. The magnitudes of the spectral peaks are used to determine instantaneous signal dependent nonlinear distortion for the system under test. There are two possible control inputs: frequency or time (step 12).

If a location of a particular frequency (frequency control input) is to be found, the method described in the aforementioned U.S. Patent Publication No. 12004-0161061-A1 is used to automatically determine a location (step 14) in time of the particular frequency within the output signal. The resulting location in time or the time control input is used to generate a narrow time window centered about the indicated time (step 16). The narrow time window that is used for windowing data is the same time window as that used to modulate the reference complex sinusoid used in the afore-mentioned U.S. Patent Publication No. 2004-0161061-A1. However the narrow time window is time shifted to be centered at the location of interest in the signal, i.e., centered at the particular frequency.

The time windowed data is subject to the method in the afore-mentioned U.S. Patent Publication No. 2004-0161027-A1 which yields "thresholded" spectral components including signal dependent distortion components (step 18) such as aliases and other nonlinear distortions, thus delineating from uncorrelated portions such as random noise or other interference. The ratio of the square root of the sum of the squares of distortion component magnitudes to the fundamental magnitude of the particular frequency as a percentage produces the instantaneous signal dependent nonlinear distortion (step 20).

Figure 2:
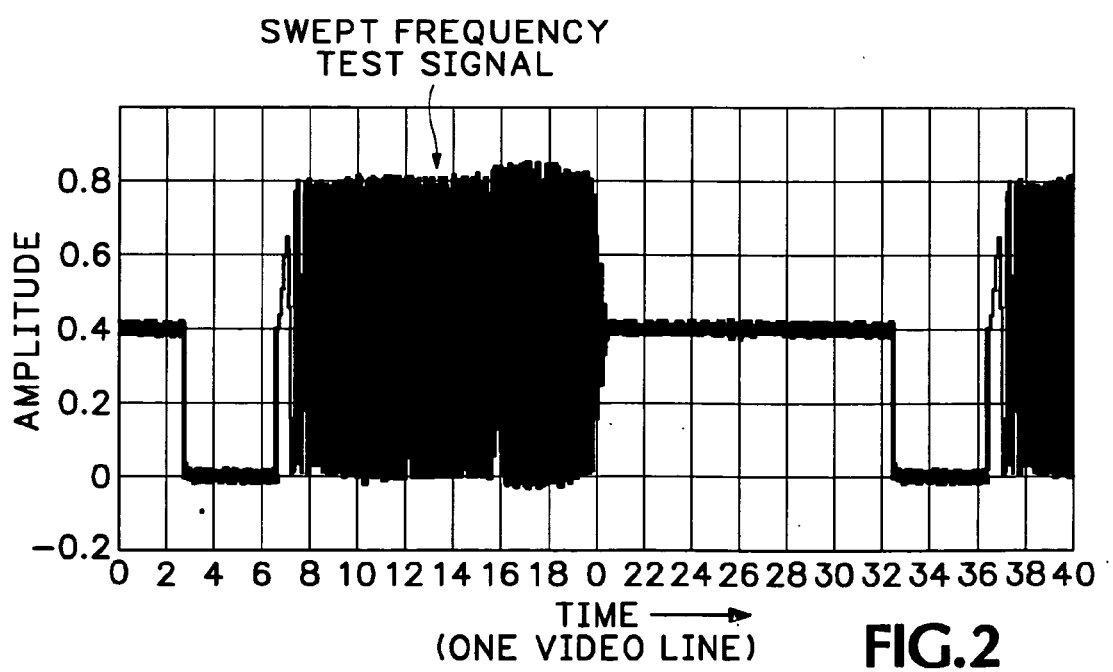
FIG. 2 is a graphic waveform view of a swept frequency sinusoidal signal that includes nonlinear distortion to be measured according to the present invention.
Figure 3:
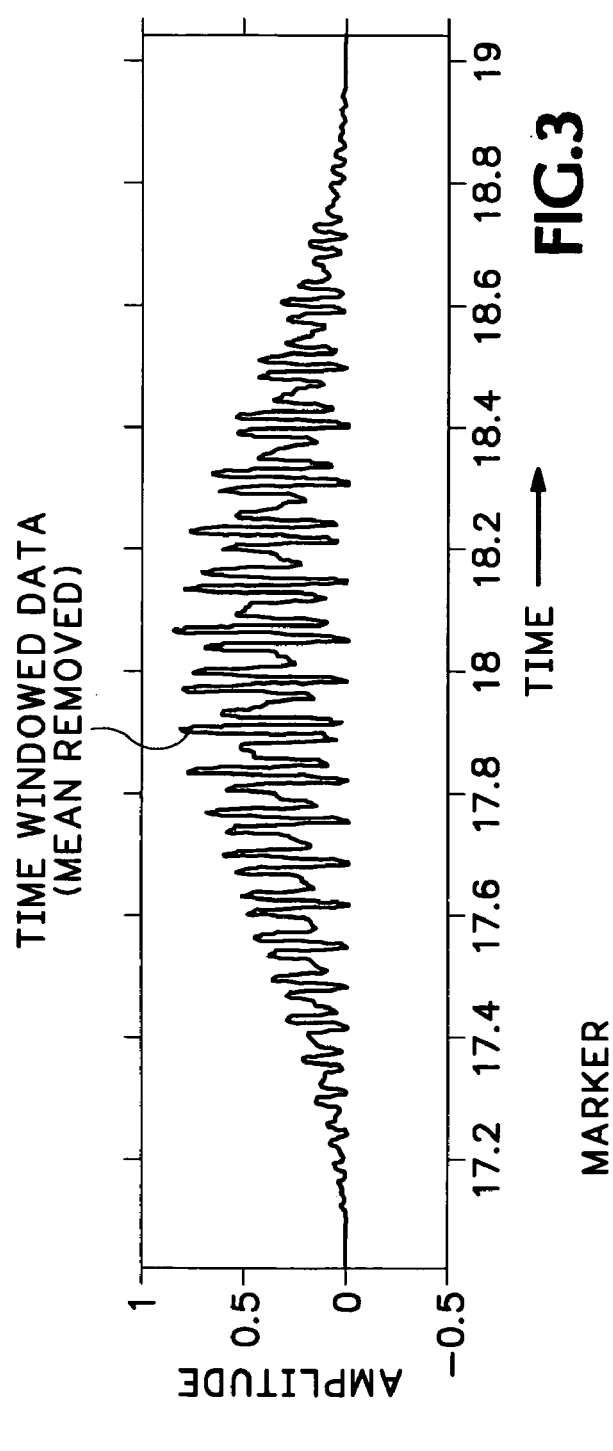
FIG. 3 is a graphic waveform view of a zoomed result of time windowing according to the present invention.
Figure 4:
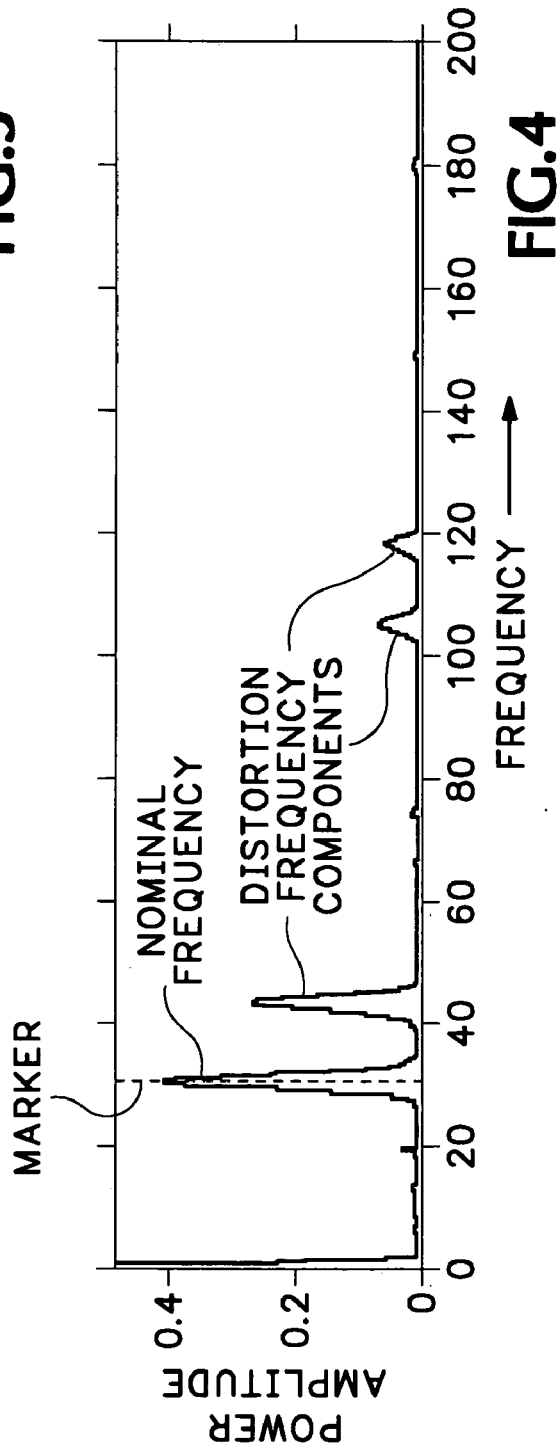
FIG. 4 is a graphic view of a spectrum for the zoomed result of FIG. 3 according to the present invention.

FIG. 2 shows one video line of an output signal from a set-top box (system under test) rendering 1080 lines for each of 59.94 frames per second of a high definition video in response to an input swept frequency test signal, the output signal having considerable distortion. FIG. 3 shows a zoomed—magnified for better display—result of time windowing about a particular frequency of interest, determined from either a time control input or a frequency control input, which has the local mean removed as per the afore-mentioned U.S. Patent Publication No. 2004-0161061-A1. The spectrum for the time windowed data of FIG. 3 is shown in FIG. 4. The dashed vertical marker shows a nominal frequency—nonlinear distortion free portion of the spectrum (the particular frequency of interest). The other spectral peaks correspond to distortion frequencies.

Thus the present invention allows the use of a swept or multi-burst sinusoidal test signal to distinguish between linear, additive noise and instantaneous signal dependent nonlinear distortion in a system under test, only requiring time windowing of the test signal as output from the system under test and spectral processing of the time windowed data. The instantaneous signal dependent nonlinear distortion measurement supplements the processing required for making frequency response measurements via the afore-mentioned U.S. Patent Publication No. 2004-0161027-A1.

What is claimed is:

1. A method of measuring instantaneous signal dependent nonlinear distortion in a system under test comprising the steps of:

applying a narrow time window to an output signal from the system under test to produce time windowed data that represents a portion of the output signal that contains a frequency of interest, the output signal being generated in response to a test signal having a varying frequency sinusoidal component and the time windowing being centered at a specified time within a corresponding varying frequency sinusoidal component of the output signal;

measuring magnitudes of spectral peaks generated from the time windowed data, wherein the spectral peaks correspond to a nominal frequency and distortion frequencies for the time windowed data; and determining from the magnitudes of the spectral peaks a measure of the instantaneous signal dependent nonlinear distortion, the measure of the instantaneous signal dependent nonlinear distortion being a ratio of a square root of a sum of the squares of the magnitudes of the spectral peaks for the distortion frequencies to the magnitude of the spectral peak for the frequency of interest.

2. The method as recited in claim 1 wherein the specific time comprises a time control input.

3. The method as recited in claim 1 wherein the specific time comprises a time location within the corresponding varying frequency sinusoidal component determined from a frequency control input.

* * * * *